US007706324B2

(12) United States Patent
Sutivong et al.

(10) Patent No.: US 7,706,324 B2
(45) Date of Patent: Apr. 27, 2010

(54) ON-DEMAND REVERSE-LINK PILOT TRANSMISSION

(75) Inventors: Arak Sutivong, Bangkok (TH); Avneesh Agrawal, San Diego, CA (US); Alexei Gorokhov, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 11/129,636

(22) Filed: May 13, 2005

(65) Prior Publication Data

US 2006/0072604 A1 Apr. 6, 2006

(51) Int. Cl.
*H04J 11/00* (2006.01)
*H04J 4/00* (2006.01)
*H04J 3/16* (2006.01)
*H04W 4/00* (2009.01)
*H04B 7/00* (2006.01)
*H04B 7/212* (2006.01)

(52) U.S. Cl. ............... 370/330; 370/203; 370/277; 370/436; 370/437; 370/442

(58) Field of Classification Search ........ 370/202–204, 370/277–278, 328–339, 342–349, 436–437, 370/441–443, 458–462, 431, 296, 310, 314, 370/350, 433; 455/67.11, 67.13, 452.1, 452.2, 455/453, 500, 463–464, 450–451, 509, 510–513, 455/550.1, 556.2, 560.561, 422.1, 515, 517; 725/87, 97–98, 101; 709/206
See application file for complete search history.

(56) References Cited

U.S. PATENT DOCUMENTS

| 6,400,699 | B1 * | 6/2002 | Airy et al. ............. 370/329 |
| 6,662,024 | B2 * | 12/2003 | Walton et al. .......... 455/562.1 |
| 6,850,732 | B2 * | 2/2005 | Patterson et al. |
| 6,940,845 | B2 * | 9/2005 | Benveniste ............ 370/349 |

(Continued)

OTHER PUBLICATIONS

Vook, Frederick et al "Signaling Methodologies to Support Closed-Loop Transmit Processing in TDD-OFDMA" IEEE C802.16e (Jul. 7, 2004).

(Continued)

*Primary Examiner*—Meless N Zewdu
(74) *Attorney, Agent, or Firm*—Dmitry R. Milikovsky; Stanton Braden

(57) ABSTRACT

Pilots are transmitted on demand on a reverse link and used for channel estimation and data transmission on a forward link. A base station selects at least one terminal for on-demand pilot transmission on the reverse link. Each selected terminal is a candidate for receiving data transmission on the forward link. The base station assigns each selected terminal with a time-frequency allocation, which may be for a wideband pilot, a narrowband pilot, or some other type of pilot. The base station receives and processes on-demand pilot transmission from each selected terminal and derives a channel estimate for the terminal based on the received pilot transmission. The base station may schedule terminals for data transmission on the forward link based on the channel estimates for all selected terminals. The base station may also process data (e.g., perform beamforming or eigensteering) for transmission to each scheduled terminal based on its channel estimate.

35 Claims, 10 Drawing Sheets

U.S. PATENT DOCUMENTS

| | | | |
|---|---|---|---|
| 6,996,415 B2 * | 2/2006 | Lee et al. | 455/522 |
| 7,020,110 B2 * | 3/2006 | Walton et al. | 370/334 |
| 7,092,731 B2 * | 8/2006 | Gopalakrishnan et al. | 455/522 |
| 7,096,041 B2 * | 8/2006 | Brunner et al. | 455/562.1 |
| 7,295,624 B2 * | 11/2007 | Onggosanusi et al. | 375/267 |
| 7,453,854 B2 * | 11/2008 | Fujishima et al. | 370/335 |
| 2001/0055297 A1 | 12/2001 | Benveniste | 370/349 |
| 2002/0067694 A1 * | 6/2002 | Cheng et al. | 370/230 |
| 2003/0002450 A1 * | 1/2003 | Jalali et al. | 370/294 |
| 2003/0108117 A1 | 6/2003 | Ketchum et al. | 375/295 |
| 2004/0085939 A1 | 5/2004 | Wallace et al. | 370/335 |
| 2004/0160919 A1 * | 8/2004 | Balachandran et al. | 370/335 |
| 2005/0277444 A1 * | 12/2005 | Rensburg et al. | 455/562.1 |

OTHER PUBLICATIONS

International Preliminary Report on Patentability-PCT/US2005/025802-The International Bureau of WIPO-Geneva, Switzerland-Nov. 13, 2007.

International Search Report-PCT/US2005/025802-International Search Authority-European Patent Office-Dec. 29, 2005.

Written Opinion-PCT/US2005/025802-International Search Authority-European Patent Office-Dec. 29, 2005.

* cited by examiner

ON-DEMAND REVERSE-LINK PILOT TRANSMISSION

BACKGROUND

I. Field

The present disclosure relates generally to communication, and more specifically to pilot transmission in a communication system.

II. Background

In a communication system, a base station processes traffic data to generate one or more modulated signals and then transmits the modulated signal(s) on a forward link (FL) to one or more terminals. The forward link (or downlink) refers to the communication link from the base station to the terminals, and the reverse link (or uplink) refers to the communication link from the terminals to the base station. The base station may serve many terminals and may select a subset of these terminals for data transmission on the forward link at any given moment.

The base station can typically improve the performance of the FL data transmission by employing advanced scheduling and/or transmission techniques. For example, the base station may schedule terminals in a manner to account for frequency selective fading (or a non-flat frequency response) observed by the terminals. As another example, the base station may perform beamforming to steer the FL data transmission toward the scheduled terminals. In order to employ the advanced scheduling and/or transmission techniques, the base station typically needs to have reasonably accurate estimates of the forward link channel responses between the base station and the terminals.

In a frequency division duxplexed (FDD) system, the forward and reverse links are allocated separate frequency bands. Consequently, the forward link channel response may not correlate well with the reverse link channel response. In this case, the terminals would need to estimate their forward link channel responses and send back the forward link channel estimates to the base station. The amount of signaling needed to send back the forward link channel estimates is typically prohibitive and thus limits or prevents the use of the advanced techniques for the FDD system.

In a time division duxplexed (TDD) system, the forward and reverse links share the same frequency band. The forward link is allocated a portion of the time and the reverse link is allocated the remaining portion of the time. In the TDD system, the forward link channel response may be highly correlated with, and may even be assumed to be reciprocal of, the reverse link channel response. For a reciprocal channel, the base station can estimate the reverse link channel response for a terminal based on a pilot transmitted by that terminal and can then estimate the forward link channel response for the terminal based on the reverse link channel estimate. This can simplify channel estimation for the forward link.

As noted above, the base station may serve many terminals. Requiring pilot transmission from all terminals all of the time may lead to extremely inefficient utilization of the system resources. This inefficiency may manifest itself as higher interference to other base stations and a larger overhead for pilots on the reverse link.

There is therefore a need in the art for techniques to more efficiently transmit pilots in a communication system.

SUMMARY

Techniques for transmitting pilots on demand on the reverse link and for using channel estimates derived from the on-demand pilots to schedule terminals and to process data for transmission on the forward link are described herein. According to an embodiment of the techniques, a base station selects at least one terminal for on-demand pilot transmission on the reverse link. Each selected terminal is a candidate for receiving data transmission on the forward link. The base station assigns each selected terminal with a time-frequency allocation, which may be for a wideband pilot, a narrowband pilot, or some other type of pilot to be transmitted on the reverse link in addition to any pilot that the terminal is required to transmit. The base station receives and processes the pilot transmission from each selected terminal and derives a channel estimate for the terminal based on the received pilot transmission. The base station may schedule terminals for data transmission on the forward link based on the channel estimates for all terminals. The base station may also process data for transmission to each scheduled terminal based on its channel estimate. For example, the base station may use the channel estimate to perform beamforming or eigensteering as described below.

Various aspects and embodiments of the invention are described in further detail below.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The on-demand pilot transmission techniques described herein may be used for various communication systems such as a frequency division multiplexed (FDM) system that transmits data on different frequency subbands, a code division multiplexed (CDM) system that transmits data using different orthogonal codes, a time division multiplexed (TDM) system that transmits data in different time slots, and so on. An orthogonal frequency division multiplexed (OFDM) system is an FDM system that effectively partitions the overall system bandwidth into multiple (K) orthogonal frequency subbands. These subbands are also called tones, subcarriers, bins, frequency channels, and so on. Each subband is associated with a respective subcarrier that may be modulated with data. An orthogonal frequency division multiple access (OFDMA) system is a multiple-access system that utilizes OFDM.

The on-demand pilot transmission techniques may also be used for a single-input single-output (SISO) system, a multiple-input single-output (MISO) system, a single-input multiple-output (SIMO) system, and a multiple-input multiple-output (MIMO) system. The single input and multiple inputs correspond to one antenna and multiple antennas, respectively, at a transmitter. The single output and multiple outputs correspond to one antenna and multiple antennas, respectively, at a receiver.

For clarity, much of the following description is for a TDD system with reciprocal forward and reverse links. The description also assumes that each base station is equipped with multiple antennas, which are the multiple inputs for a forward link (FL) transmission and the multiple outputs for a reverse link (RL) transmission. The multiple antennas may be used for advanced transmission techniques such as beamforming and eigensteering, which are described below. For simplicity, the portion of the description that relates to OFDM assumes that all K total subbands are usable for data and pilot transmission (i.e., there are no guard subbands).

Figure 1:
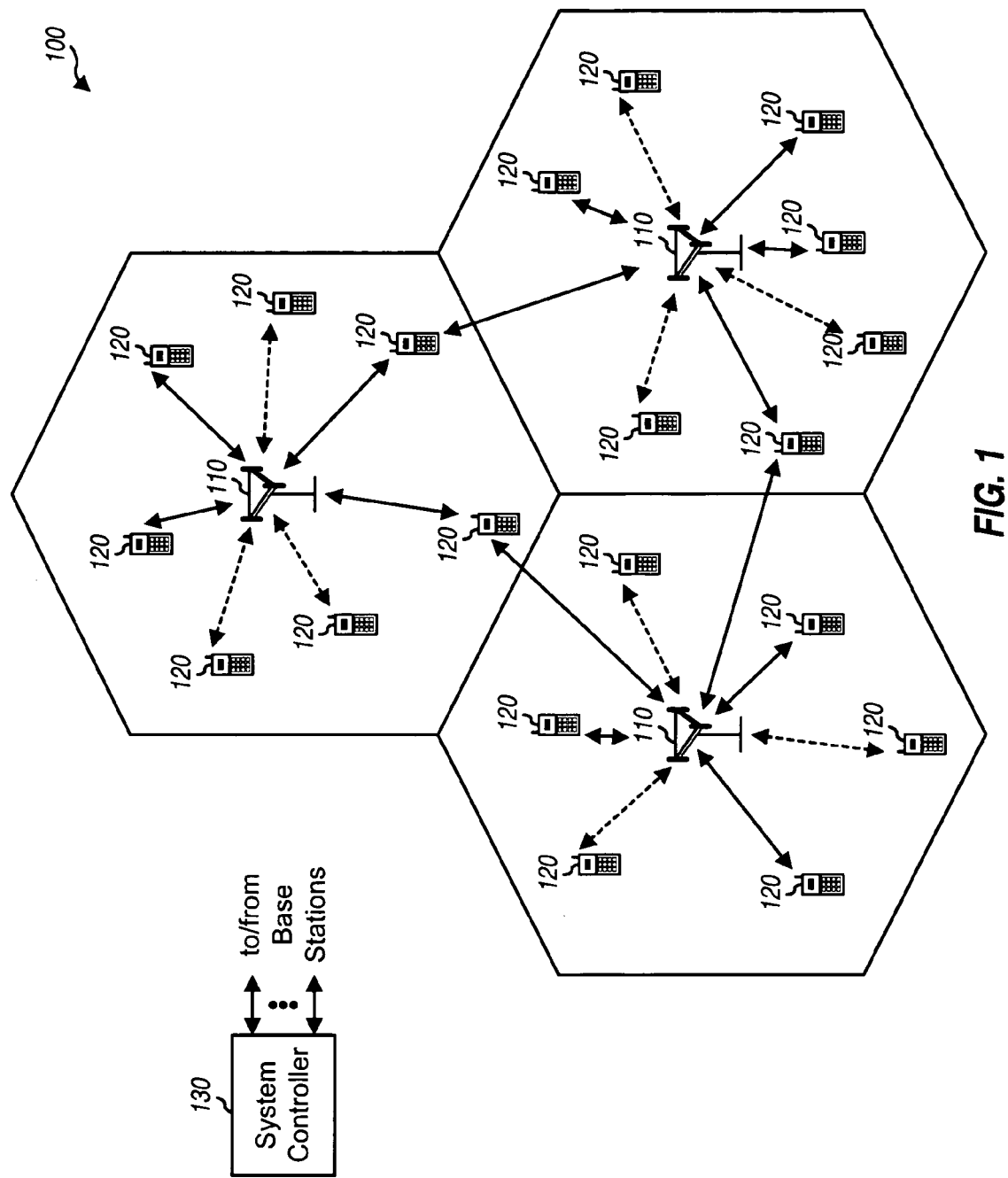
FIG. 1 shows a TDD communication system.

FIG. 1 shows a TDD communication system 100 with base stations 110 communicating with wireless terminals 120. A base station is a fixed station used for communicating with the terminals and may also be called an access point, a Node B, or some other terminology. Terminals 120 are typically dispersed throughout the system, and each terminal may be fixed or mobile. A terminal may also be called a mobile station, a user equipment (UE), a wireless device, or some other terminology. The terms "terminal" and "user" are used interchangeably herein. Each terminal may communicate with one or possibly multiple base stations on the forward and reverse links at any given moment. In FIG. 1, a solid line with arrows on both ends indicates data transmission on the forward and/or reverse link at the current time, and a broken line with arrows on both ends indicates potential data transmission at a future time. For a centralized architecture, a system controller 130 provides coordination and control for base stations 110.

Figure 2:
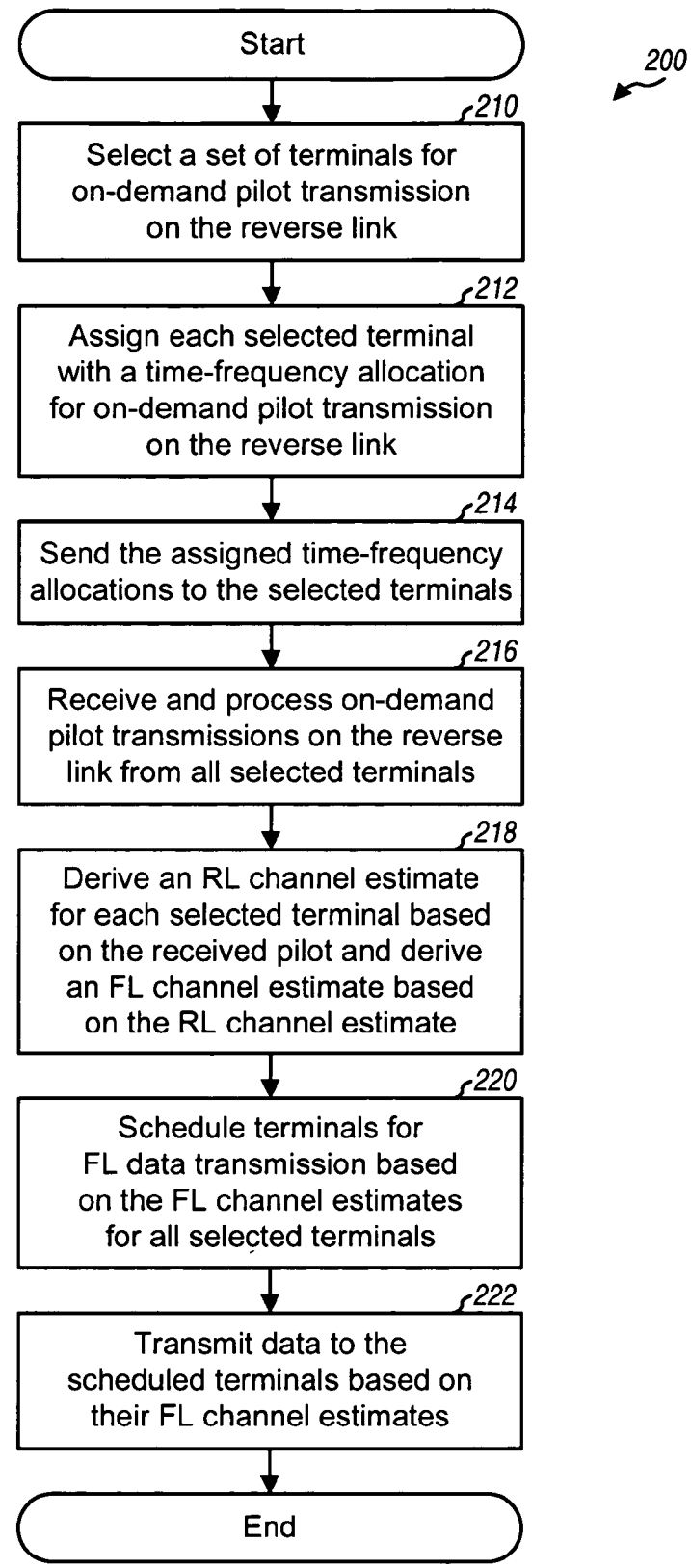
FIG. 2 shows a process for transmitting data on the forward link with on-demand pilot transmission on the reverse link.

FIG. 2 shows a process 200 performed by a base station for data transmission on the forward link with on-demand pilot transmission on the reverse link. Initially, the base station selects a set of one or more terminals for on-demand pilot transmission on the reverse link (block 210). The base station may serve many terminals on the forward link but may be able to transmit data to only a subset of these terminals at any given moment. The terminals selected for on-demand pilot transmission on the reverse link may be terminals that are currently receiving FL data transmission from the base station, terminals that are scheduled for FL data transmission in an upcoming time interval, terminals that might receive FL data transmission in the future, or a combination thereof. The on-demand pilots are in addition to any pilot that the terminals are required to transmit.

The base station assigns each selected terminal with a time-frequency allocation for on-demand pilot transmission on the reverse link (block 212). The time-frequency allocation for each selected terminal indicates a specific time interval and/or specific frequency subbands on which to transmit an on-demand pilot, which may be a wideband pilot, a narrowband pilot, or some other type of pilot. The time-frequency allocation for each selected terminal may be dependent on various factors such as the channel structures used by the system for the forward and reverse links, the manner in which the on-demand pilot is transmitted, the intended use of the on-demand pilot, and so on. The assigned time-frequency allocations are explicitly and/or implicitly signaled to the selected terminals (block 214). For example, a terminal that currently receives FL data transmission may transmit an on-demand pilot on the reverse link without explicit signaling whereas a terminal that will or might be scheduled for FL data transmission may receive explicit signaling indicating the assigned time-frequency allocation.

The base station receives and processes on-demand pilot transmissions on the reverse link from all selected terminals (block 216). The base station derives an RL channel estimate for each selected terminal based on the pilot received from that terminal (block 218). For a TDD system, the forward and reverse links may be assumed to be reciprocal. The base station can then derive an FL channel estimate for each selected terminal based on its RL channel estimate (also block 218). The on-demand pilot transmissions allow the base station to obtain the latest forward link channel information for the terminals that will or might be scheduled for FL data transmission without incurring a large overhead or consuming a large amount of reverse link resources.

The base station may employ advanced scheduling and/or transmission techniques in order to improve the performance of the FL data transmission. The base station may schedule terminals for FL data transmission based on the FL channel estimates for all terminals selected for on-demand pilot transmission on the reverse link (block 220). For example, the base station may perform (1) multi-user diversity scheduling and select terminals with good FL channel estimates for FL data transmission, (2) frequency-sensitive scheduling and select terminals for FL data transmission on subbands with good FL channel gains, and/or (3) other types of channel dependent scheduling. The base station may also transmit data to the scheduled terminals based on their FL channel estimates (block 222). For example, the base station may perform beamforming to direct a FL data transmission to a scheduled terminal. The base station may also perform eigensteering to transmit multiple data streams to a scheduled terminal. Beamforming, eigensteering, and various blocks in FIG. 2 are described below.

Figure 3:
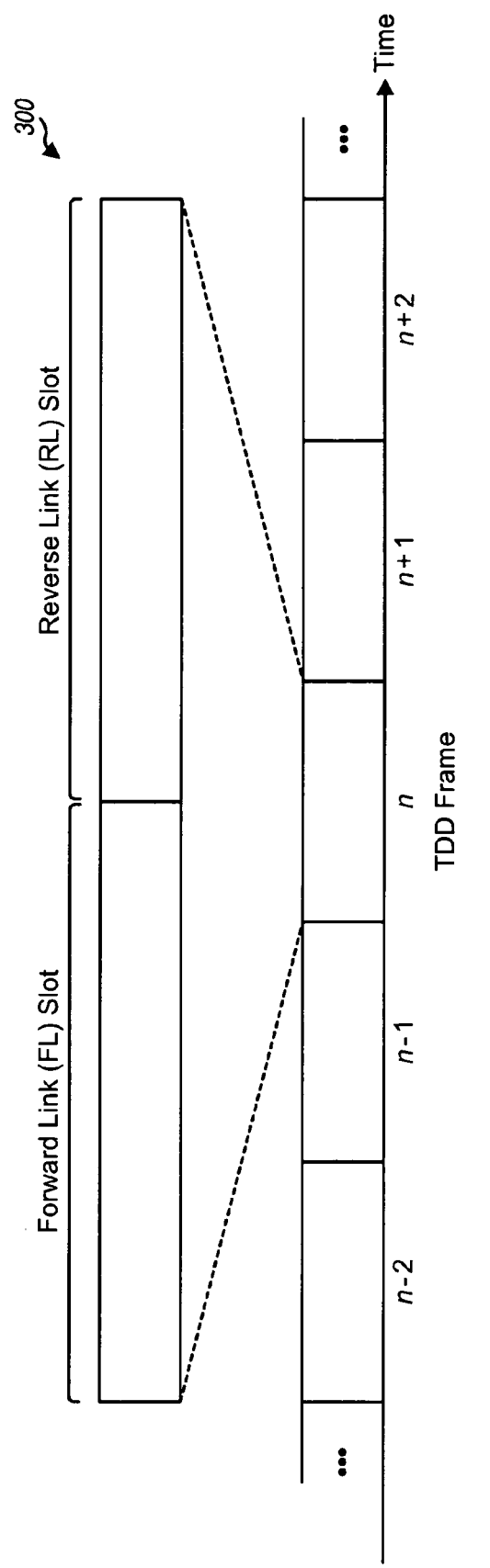
FIG. 3 shows an exemplary frame structure for the TDD system.

FIG. 3 shows an exemplary frame structure 300 for TDD system 100. Data transmission on the forward and reverse links occurs in units of TDD frames. Each TDD frame may span a fixed or variable time duration. Each TDD frame is further partitioned into (1) a forward link (FL) slot during which data and pilot are transmitted on the forward link and (2) a reverse link (RL) slot during which data and pilot are transmitted on the reverse link. The FL slot may precede the RL slot as shown in FIG. 3, or vice versa. Each slot may have a fixed or variable time duration.

The terminals may transmit on-demand pilots on the reverse link in various manners. The on-demand pilots may be wideband pilots that allow the base station to employ advanced scheduling techniques as well as advanced transmission techniques. The on-demand pilots may also be narrowband pilots that allow the base station to employ advanced transmission techniques on specific subbands. Several embodiments of on-demand pilot transmission are described below.

Figure 4:
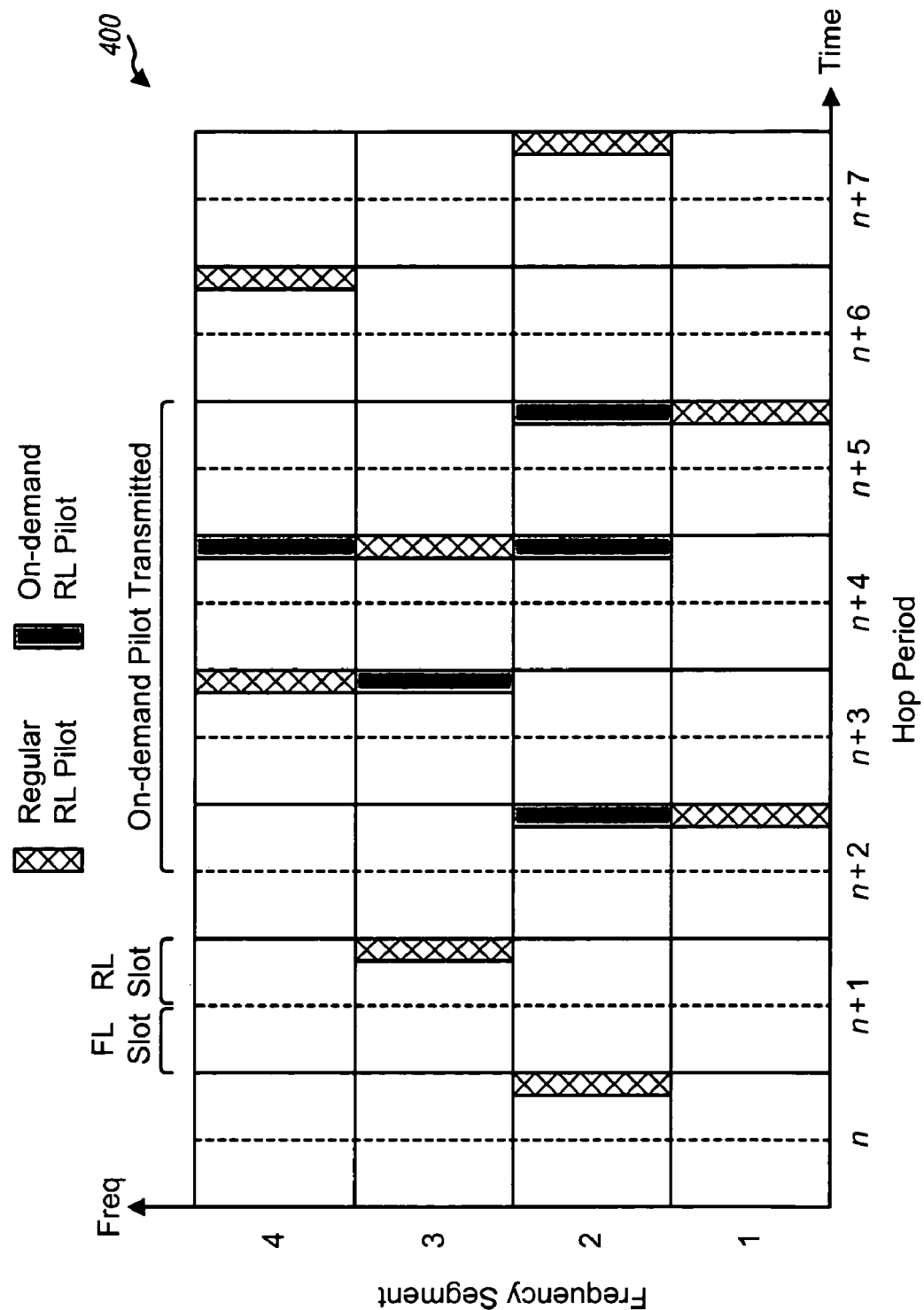
FIG. 4 shows on-demand pilot transmission on segmented channels.

FIG. 4 shows an embodiment of on-demand pilot transmission on segmented channels. For this embodiment, a channel structure 400 with frequency hopping is used for signaling transmission on the reverse link. The overall system bandwidth is divided into S frequency segments, where in general S>1. For example, the system bandwidth may be 20 MHz, four segments may be formed as shown in FIG. 4, and each segment may be 5 MHz. S signaling channels are formed with the S segments. Each signaling channel is mapped to one segment in each hop period and hops from segment to segment over time to achieve frequency diversity. A hop period may span one TDD frame (as shown in FIG. 4) or multiple TDD frames. The hopping may be based on a frequency hopping (FH) function/sequence f(s, n) that selects a specific segment s for each hop period n.

Each terminal is assigned one signaling channel for transmission of signaling on the reverse link. The signaling may include, e.g., a channel quality indicator (CQI), acknowledgments (ACKs) for packets received on the forward link, and so on. The signaling channel for one terminal is shown by the cross-hashed boxes in FIG. 4.

Each terminal also transmits a regular pilot on the assigned signaling channel. The regular pilot is a pilot that the terminal is required to transmit. A terminal may transmit the regular pilot and signaling separately (e.g., using TDM, FDM, or CDM) or may embed the pilot within the signaling. For example, a terminal may transmit an N-bit signaling value by (1) identifying a code sequence corresponding to that signaling value from among $2^N$ possible code sequences, (2) generating a waveform for that code sequence, and (3) transmitting the waveform. A base station receives the transmitted waveform, determines a hypothesized code sequence that is most likely to have been transmitted based on the received waveform, removes the hypothesized code sequence from the received waveform, and processes the resultant waveform to estimate the RL channel response.

A base station can obtain an RL channel estimate for a terminal based on the regular pilot sent on the signaling channel assigned to that terminal. The base station may transmit data to the terminal on all or a portion of the segment used by the assigned signaling channel. In this case, the base station can use the RL channel estimate for the assigned signaling channel for FL data transmission to the terminal. The base station may also transmit data to the terminal on one or more segments that are not used by the assigned signaling channel. In this case, the base station can direct the terminal to transmit an on-demand pilot on the segment(s) that will be used by the base station. For the example shown in FIG. 4, the terminal transmits an on-demand pilot on segment 2 in hop period n+2, segment 3 in hop period n+3, segments 2 and 4 in hop period n+4, and segment 2 in hop period n+5.

FIG. 4 shows an example in which the on-demand pilot is sent on one or more additional segments that are adjacent to the segment used by the assigned signaling channel. In general, the on-demand pilot may be sent on any number of segments and on any of the segments. The on-demand pilot transmission reduces RL overhead while providing the necessary feedback for the base station to effectively transmit data on the forward link.

Figure 5:
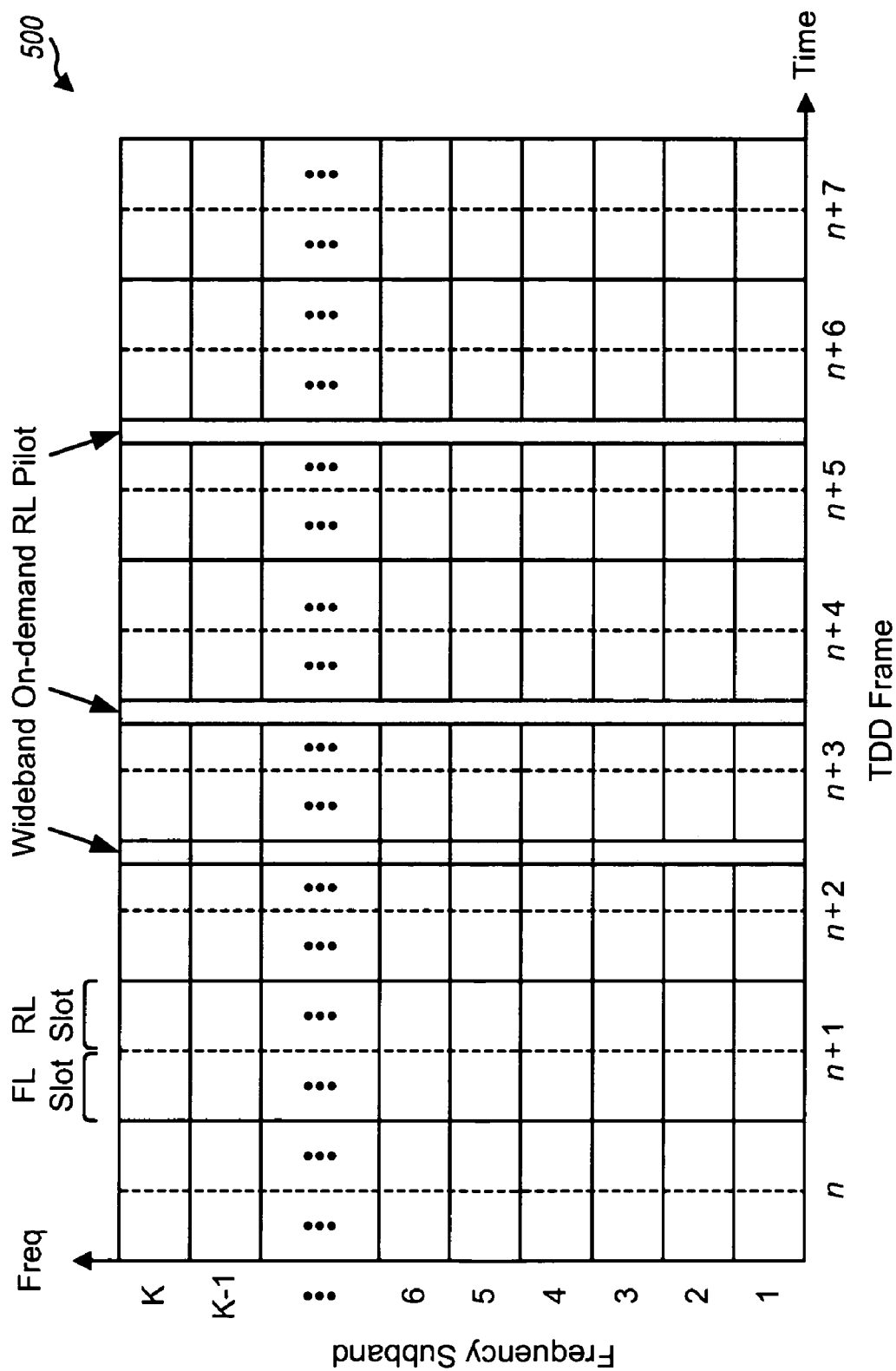
FIG. 5 shows wideband on-demand pilot transmission.

FIG. 5 shows an embodiment of wideband on-demand pilot transmission for a channel structure 500. For this embodiment, each terminal transmits a regular pilot along with data on the reverse link when scheduled for RL data transmission and transmits no pilot when not scheduled. Each terminal transmits a wideband on-demand pilot on the reverse link whenever directed by a base station. Multiple terminals may transmit wideband on-demand pilots simultaneously in a time window designated for on-demand pilot transmission. This time window may occur in each TDD frame (as shown in FIG. 5), each scheduling interval, and so on. The wideband on-demand pilots may be generated in various manners. To mitigate pilot-to-pilot interference among multiple terminals, the wideband on-demand pilots transmitted by the terminals may be orthogonalized in the frequency domain or the time domain.

In an embodiment, a terminal generates a wideband on-demand pilot in the frequency domain using CDM. The terminal covers a pilot symbol for each frequency subband with an orthogonal code assigned to the terminal. This orthogonal code may be a Walsh code, an orthogonal variable spreading factor (OVSF) code, a quasi-orthogonal function (QOF), and so on. Covering is a process whereby a symbol to be transmitted is multiplied by all L chips of an L-chip orthogonal code to generate L covered symbols, which are sent in L symbol periods. For an OFDM-based system, the terminal further processes the covered symbols for all K subbands in each symbol period to generate an OFDM symbol for that symbol period. The terminal transmits the wideband on-demand pilot in an integer multiple of L symbol periods. Each terminal is assigned a different orthogonal code. A base station is able to recover the wideband on-demand pilot from each terminal based on the orthogonal code assigned to that terminal.

In another embodiment, a terminal generates a wideband on-demand pilot in the time domain using CDM. For this embodiment, the terminal covers a pilot symbol with its assigned L-chip orthogonal code to generate L covered symbols. The terminal then spectrally spreads the L covered symbols across the entire system bandwidth (e.g., all K subbands in an OFDM-based system) with a pseudo-random number (PN) code that is common for all terminals. The terminal transmits the wideband on-demand pilot in an integer multiple of L sample periods. The base station is able to recover the wideband on-demand pilot from each terminal based on the assigned orthogonal code.

In yet another embodiment, a terminal generates a wideband on-demand pilot in the time domain with a PN code assigned to that terminal. For this embodiment, a terminal spectrally spreads a pilot symbol across the entire system bandwidth with its assigned PN code, which is used for both orthogonalization and spectral spreading. Each terminal is assigned a different PN code, which may be a different time shift of a common PN code. The base station is able to recover the wideband on-demand pilot from each terminal based on the assigned PN code.

In yet another embodiment, a terminal generates a wideband on-demand pilot in the frequency domain using FDM. For example, M sets of subbands may be formed with the K total subbands with each set containing K/M subbands. The K/M subbands in each set may be (e.g., uniformly) distributed from across the entire system bandwidth to allow a base station to derive a channel estimate for the full system bandwidth. The M subband sets may be assigned to M different terminals for on-demand pilot transmission. Each terminal transmits its wideband on-demand pilot on its assigned subband set. The base station can recover the wideband on-demand pilot for each terminal from the assigned subband set. The base station can derive a channel estimate for the entire system bandwidth by performing interpolation, least squares approximation, and so on, on the received wideband pilot.

For the example shown in FIG. 5, a terminal transmits a wideband on-demand pilot in TDD frames n+2, n+3 and n+5. A base station can obtain an RL channel estimate for this terminal for the entire system bandwidth based on the wideband on-demand pilot. The base station may transmit data to the terminal on all or a portion of the system bandwidth using an FL channel estimate derived from the RL channel estimate.

Figure 6:
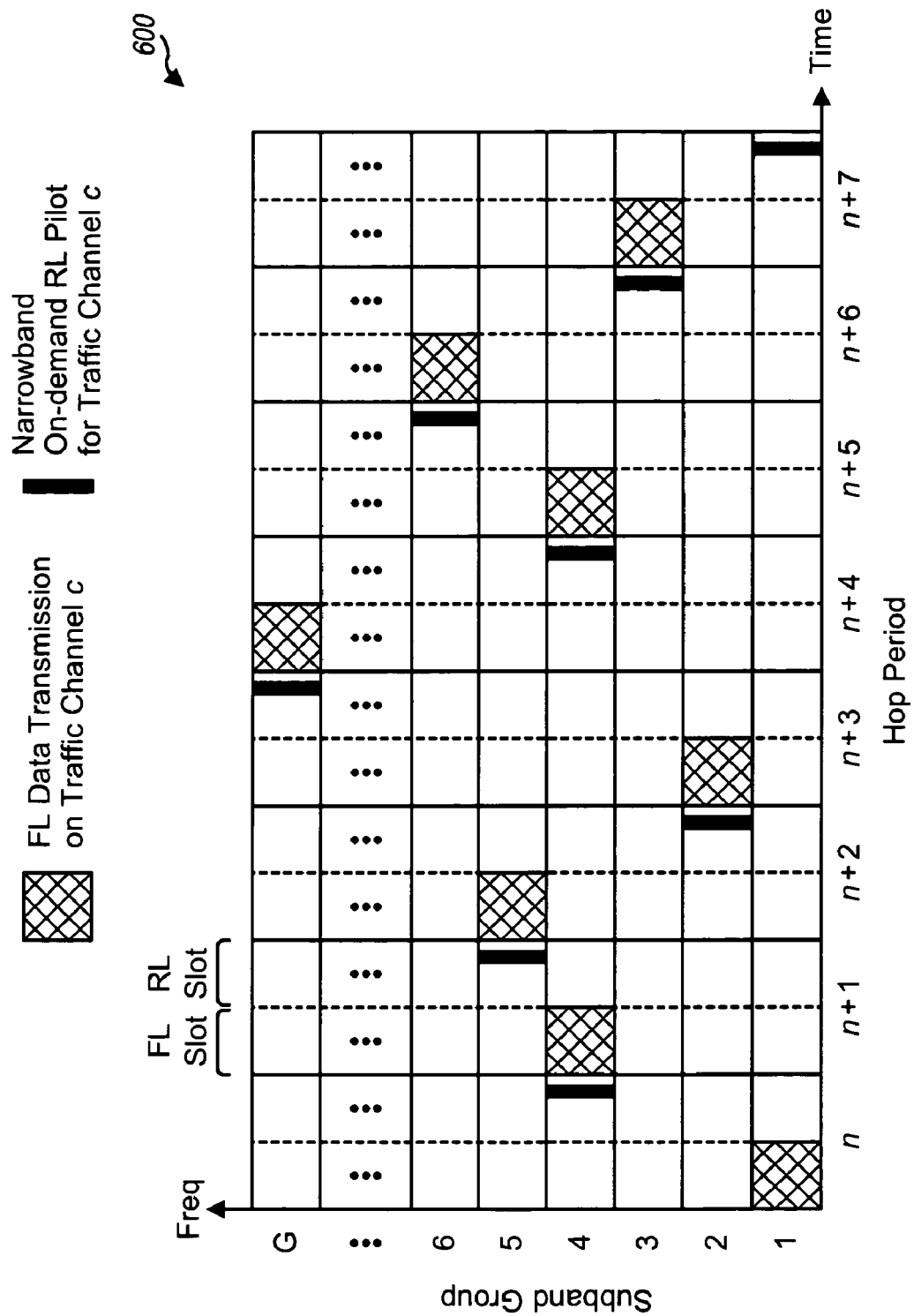
FIG. 6 shows narrowband on-demand pilot transmission.

FIG. 6 shows an embodiment of narrowband on-demand pilot transmission. For this embodiment, a channel structure 600 with frequency hopping is used for data transmission on the forward link. The K total subbands are arranged into G groups and each group contains S subbands, where in general $G>1$, $S \geq 1$, and $G \cdot S \leq K$. The subbands in each group may be contiguous or non-contiguous (e.g., distributed across the K total subbands). G traffic channels may be formed with the G subband groups. Each traffic channel is mapped to one subband group in each hop period and hops from subband group to subband group over time to achieve frequency diversity. A hop period may span one TDD frame (as shown in FIG. 6) or multiple TDD frames. G frequency hopping FL traffic channels are available for FL data transmission. FIG. 6 shows the subband groups used for one FL traffic channel c. The channel structure for the reverse link may be the same or different from the channel structure for the forward link.

A base station may transmit data to up to G terminals using the G FL traffic channels. The base station selects terminals for on-demand pilot transmission, assigns FL traffic channels to these terminals, and directs the terminals to transmit narrowband on-demand pilots on the reverse link on the assigned FL traffic channels. The selected terminals may or may not be transmitting data on the reverse link to the base station. The selected terminals transmit their narrowband on-demand pilots in a designated time window, which may occur in each TDD frame (as shown in FIG. 6), each hop period, each scheduling interval, and so on. The on-demand pilot transmission on each FL traffic channel precedes the FL data transmission on the same traffic channel so that the RL channel estimate obtained from the on-demand pilot can be used for the FL data transmission. For the example shown in FIG. 6, FL traffic channel c uses subband group 4 in hop period n+1, subband group 5 in hop period n+2, subband group 2 in hop period n+3, and so on. A terminal that is assigned FL traffic channel c for on-demand pilot transmission transmits a narrowband on-demand pilot on subband group 4 in hop period n, subband group 5 in hop period n+1, subband group 2 in hop period n+2, and so on. Multiple terminals may transmit narrowband on-demand pilots on the same traffic channel in the same data frame using CDM, TDM, and/or FDM.

The base station obtains a narrowband RL channel estimate for each selected terminal based on the narrowband on-demand pilot received from that terminal. The base station can use the narrowband RL channel estimate (e.g., for beamforming) for FL data transmission to the terminal. The base station may also collect narrowband channel estimates over a period of time to obtain a wideband channel estimate, which may be used for frequency-sensitive scheduling.

FIGS. 4 through 6 show three exemplary on-demand pilot transmission schemes for the reverse link. The wideband on-demand pilots (e.g., as shown in FIG. 5) allow the base station to obtain more channel information for the forward link at the expense of more reverse link resources. The narrowband on-demand pilots (e.g., as shown in FIG. 6) allow the base station to obtain channel information for only the subbands of interest, which minimizes reverse link resource consumption. A combination of wideband and narrowband on-demand pilots may also be used. For example, terminals that might be scheduled for FL data transmission may transmit wideband on-demand pilots whereas terminals that are already scheduled may transmit narrowband on-demand pilots. Various other on-demand pilot transmission schemes may also be devised, and this is within the scope of the invention.

In general, the on-demand pilots may be transmitted in any part of the RL slot. In an embodiment, a portion of the RL slot (e.g., a few OFDM symbols) in each TDD frame is reserved for the on-demand pilots. The reserved portion may be located toward the end of the RL slot in order to minimize the amount of time between the RL on-demand pilot transmission and the FL data transmission that uses the FL channel estimate derived from the on-demand pilot. In another embodiment, the on-demand pilots are transmitted in a reserved portion of every P TDD frames, where P may be any integer. P may also be individually selected for each terminal. For example, P may be a small value for a mobile terminal with rapidly changing channel conditions and may be a larger value for a stationary terminal with relatively static channel conditions. In yet another embodiment, the on-demand pilots are transmitted on top of, and superimposed over, other transmissions on the reverse link. For this embodiment, the on-demand pilots act as interference to the other RL transmissions, and vice versa. The on-demand pilots and the other RL transmissions are then transmitted in a manner to account for this interference. The on-demand pilots may also be transmitted in other manners.

The on-demand pilot transmission may be used in a system that employs an incremental redundancy (IR) transmission scheme for the forward link, which is also commonly called a hybrid automatic repeat request (H-ARQ) transmission scheme. With H-ARQ, a base station encodes a data packet to generate a coded packet and further partitions the coded packet into multiple coded blocks. The first coded block may contain sufficient information to allow a terminal to recover the data packet under good channel condition. Each remaining coded block contains additional redundancy information for the data packet.

The base station transmits the coded blocks for the data packet to the terminal, one coded block at a time starting with the first coded block. The first block transmission is also called the first H-ARQ transmission, and each subsequent block transmission is also called an H-ARQ retransmission. The terminal receives each transmitted coded block, reassembles the symbols for all received coded blocks, decodes the reassembled symbols, and determines whether the packet was decoded correctly or in error. If the packet was decoded correctly, then the terminal sends an acknowledgment (ACK) to the base station, and the base station terminates the transmission of the packet. Conversely, if the packet was decoded in error, then the terminal sends a negative acknowledgment (NAK), and the base station transmits the next coded block (if any is left) for the packet. The block transmission and decoding continue until the packet is decoded correctly by the terminal or all coded blocks for the packet have been transmitted by the base station. Typically, ACKs are explicitly sent and NAKs are implicitly sent (e.g., presumed by the absence of ACKs), or the converse may be true. For clarity, the following description assumes that ACKs and NAKs are both explicitly sent.

For each block transmission in an H-ARQ transmission, some delays are incurred for the terminal to decode the packet and send feedback (e.g., ACK or NAK) for the packet, and for the base station to receive the feedback and determine whether to transmit another coded block for the packet. To account for this delay, the transmission time line may be partitioned into multiple (Q) interlaces, where in general Q>1. For example, two interlaces may be defined whereby interlace 1 may be for TDD frames with even indices and interlace 2 may be for TDD frames with odd indices. The base station may transmit one coded block on a traffic channel in each TDD frame and may transmit coded blocks for Q different packets on the Q interlaces.

Figure 7:
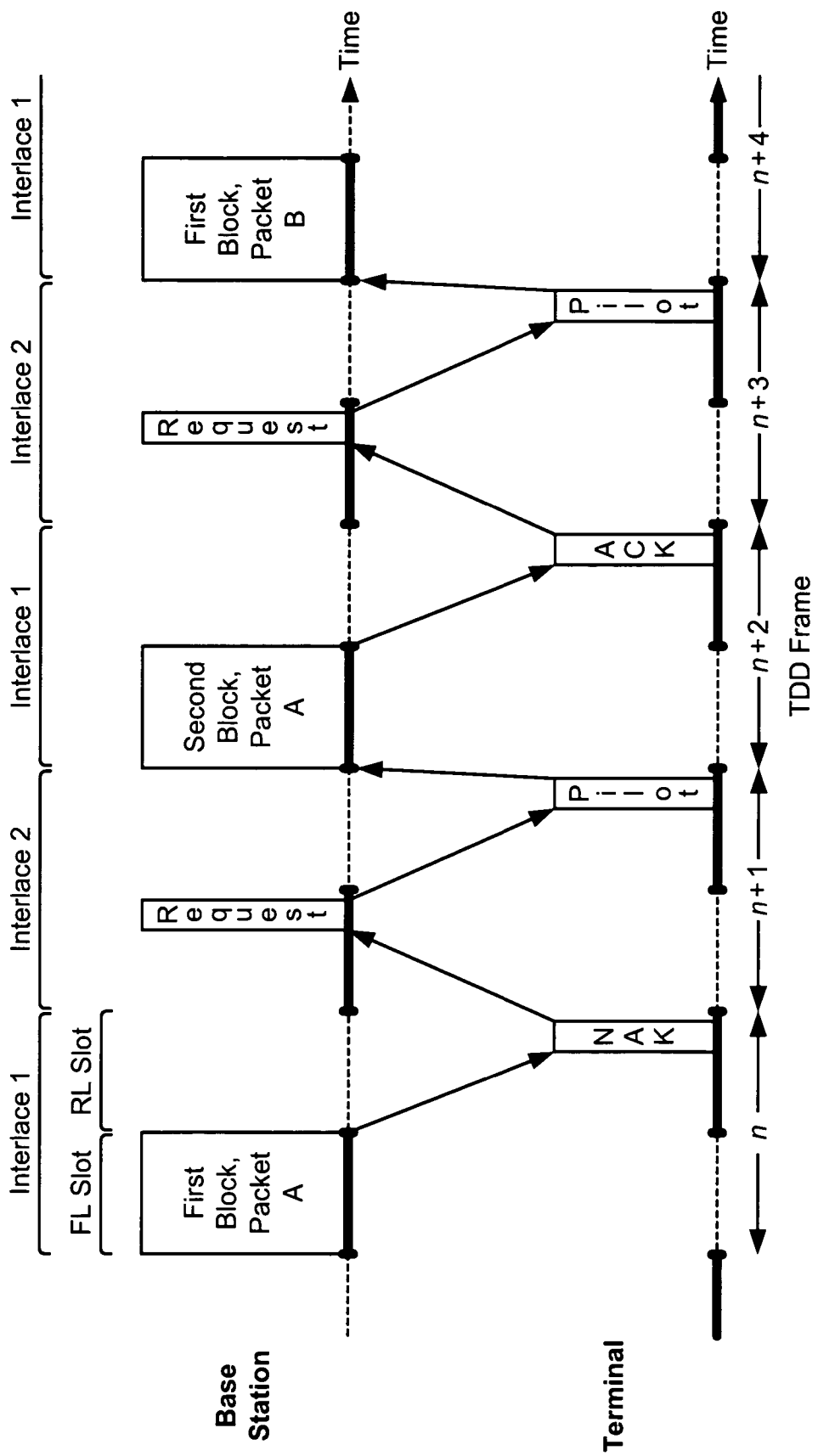
FIG. 7 shows on-demand pilot transmission for H-ARQ with two interlaces.

FIG. 7 shows an embodiment of an H-ARQ transmission with on-demand pilot transmission in a TDD system with two interlaces. For the example shown in FIG. 7, the base station transmits the first coded block for a new packet A to terminal u on interlace 1 in TDD frame n. Terminal u receives the first coded block, decodes packet A in error, and sends a NAK in TDD frame n. The base station receives the NAK, determines that another coded block needs to be transmitted for packet A, and sends to terminal u a request for an on-demand pilot in TDD frame n+1. This pilot request may be implicit and not actually sent since both the base station and terminal u know that the next block transmission on interlace 1 is for terminal u. The base station may transmit a coded block for another packet to terminal u or another terminal on interlace 2 in TDD frame n+1, which is not shown in FIG. 7 for clarity.

Terminal u receives the pilot request and transmits an on-demand pilot on the reverse link in TDD frame n+1. The base station receives the on-demand pilot from terminal u, derives an RL channel estimate for terminal u, processes the second coded block for packet A with the RL channel estimate, and transmits this block to terminal u on interlace 1 in TDD frame n+2. Terminal u receives the second coded block, decodes packet A correctly based on the received first and second coded blocks, and sends an ACK in TDD frame n+2. The base station receives the ACK and determines that the transmission of packet A can be terminated.

The base station may transmit a new packet B on interlace 1 starting in TDD frame n+4 to terminal u or another terminal. The base station selects one or more terminals (terminal u and/or other terminals) for on-demand pilot transmission and explicitly and/or implicitly sends a pilot request to each selected terminal in TDD frame n+3. Each selected terminal receives the pilot request and transmits an on-demand pilot on the reverse link in TDD frame n+3. The base station receives and processes the on-demand pilots from all selected terminals and derives an RL channel estimate for each terminal. The base station may employ advanced scheduling techniques and schedule a terminal for FL data transmission based on the RL channel estimates for all selected terminals. The base station then transmits the first coded block for the new packet B (e.g., using the RL channel estimate) to the scheduled terminal on interlace 1 in TDD frame n+4. For this embodiment, the base station is able to obtain the RL channel estimate for the scheduled terminal prior to the first block transmission and is able to use advanced scheduling and/or transmission techniques for the first block transmission.

The processing shown in FIG. 7 is for one FL traffic channel. The same processing may be performed for each FL traffic channel supported by the base station.

For the embodiment shown in FIG. 7, the base station transmits data on one interlace a (e.g., interlace 1) and sends pilot requests on the other interlace b (e.g., interlace 2). The feedback (ACK or NAK) for the current packet transmission on interlace a determines which terminal should transmit on-demand pilot on the reverse link. If another block transmission is needed, then the terminal currently receiving the packet transmission on interlace a should continue to transmit the on-demand pilot. Otherwise, another terminal might be scheduled for a new packet transmission on interlace a and should transmit the on-demand pilot.

The embodiment shown in FIG. 7 assumes that a terminal can receive a block transmission on a given TDD frame, decode the packet, and send feedback within the same TDD frame. A delay of one TDD frame is incurred for the base station to send a pilot request and for the terminal to transmit an on-demand pilot on the reverse link. If the decoding delay is longer than the interlace duration and the terminal cannot send feedback within the same TDD frame, then one or more additional interlaces may be defined to account for the additional delay incurred to support on-demand pilot transmission.

Figure 8:
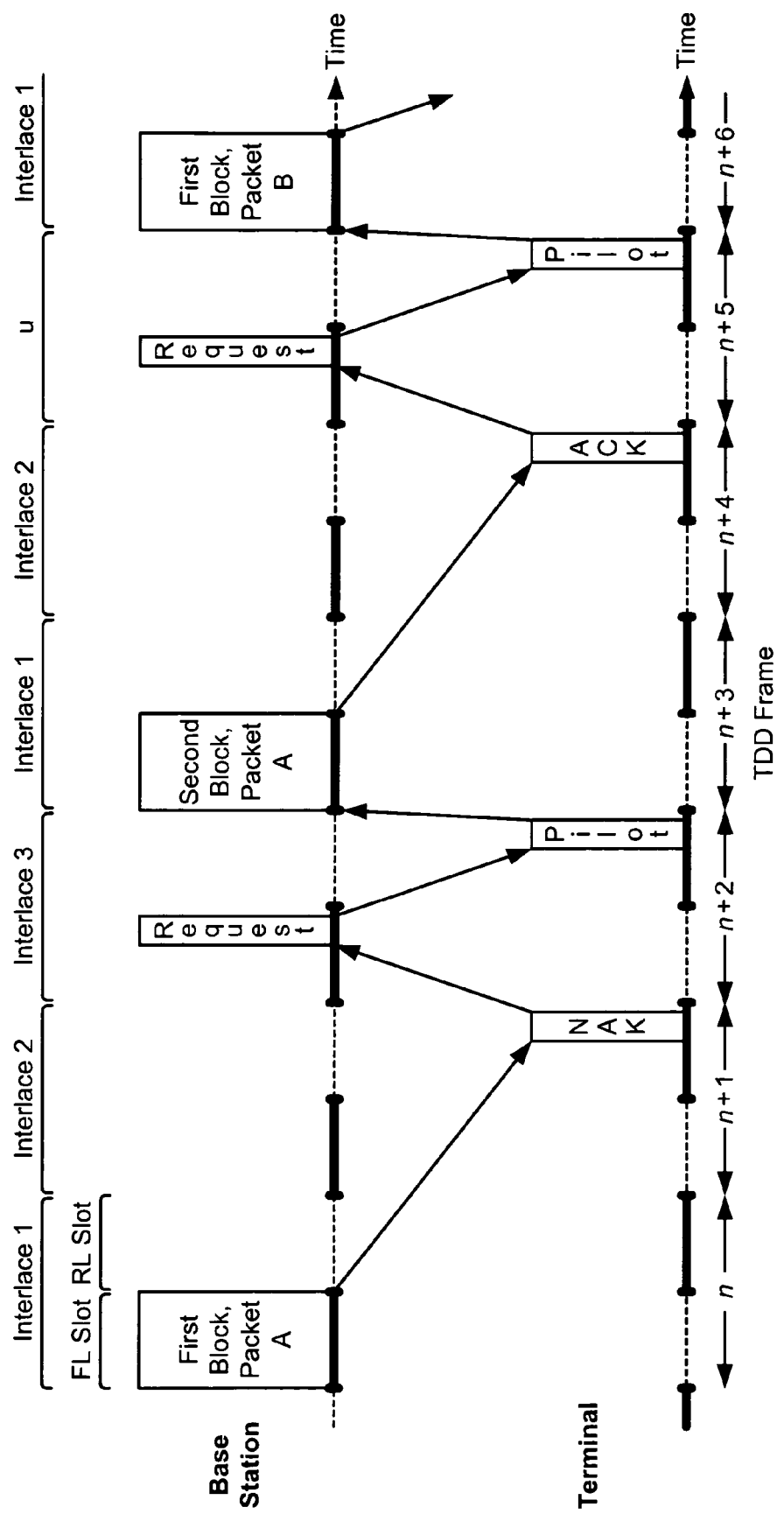
FIG. 8 shows on-demand pilot transmission for H-ARQ with three interlaces.

FIG. 8 shows an embodiment of an H-ARQ transmission with on-demand pilot transmission in a TDD system with three interlaces. For the example shown in FIG. 8, the base station transmits the first coded block for packet A to terminal u on interlace 1 in TDD frame n. Terminal u receives the first coded block, decodes packet A in error, and because of decoding delay sends a NAK in TDD frame n+1. The base station receives the NAK and sends a pilot request to terminal u in TDD frame n+2. Terminal u receives the pilot request and transmits an on-demand pilot on the reverse link in TDD frame n+2. The base station receives and processes the on-demand pilot from terminal u, derives an RL channel estimate, and transmits the second coded block for packet A to terminal u on interlace 1 in TDD frame n+3.

Terminal u receives the second coded block, decodes packet A correctly, and because of decoding delay sends an ACK in TDD frame n+4. The base station receives the ACK, selects one or more terminals for on-demand pilot transmission, and sends a pilot request to each selected terminal in TDD frame n+5. Each selected terminal receives the pilot request and transmits an on-demand pilot on the reverse link in TDD frame n+5. The base station receives and processes the on-demand pilots from all selected terminals, schedules a terminal for FL data transmission, and transmits the first coded block for packet B to the scheduled terminal on interlace 1 in TDD frame n+6.

In general, any number of interlaces may be defined to account for retransmission latency for H-ARQ. The interlace duration may be sufficiently long to allow a terminal to quickly acknowledge a block transmission, e.g., as shown in FIG. 7. However, if the interlace duration is long in comparison to the coherence time of the communication link, then the FL channel estimate obtained from the on-demand pilot may be stale during the ensuing FL data transmission. More interlaces of shorter duration can account for decoding delay and also shorten the time between the RL on-demand pilot transmission and the ensuing FL data transmission.

For the embodiments shown in FIGS. 7 and 8, one TDD frame of delay is incurred to support on-demand pilot transmission for an H-ARQ transmission. This additional delay allows the base station to select one or more terminals for on-demand pilot transmission on the reverse link in each TDD frame. However, this additional delay may increase retransmission latency for H-ARQ, e.g., as shown in FIG. 8. This additional delay may be avoided by sending speculative pilot requests.

Figure 9:
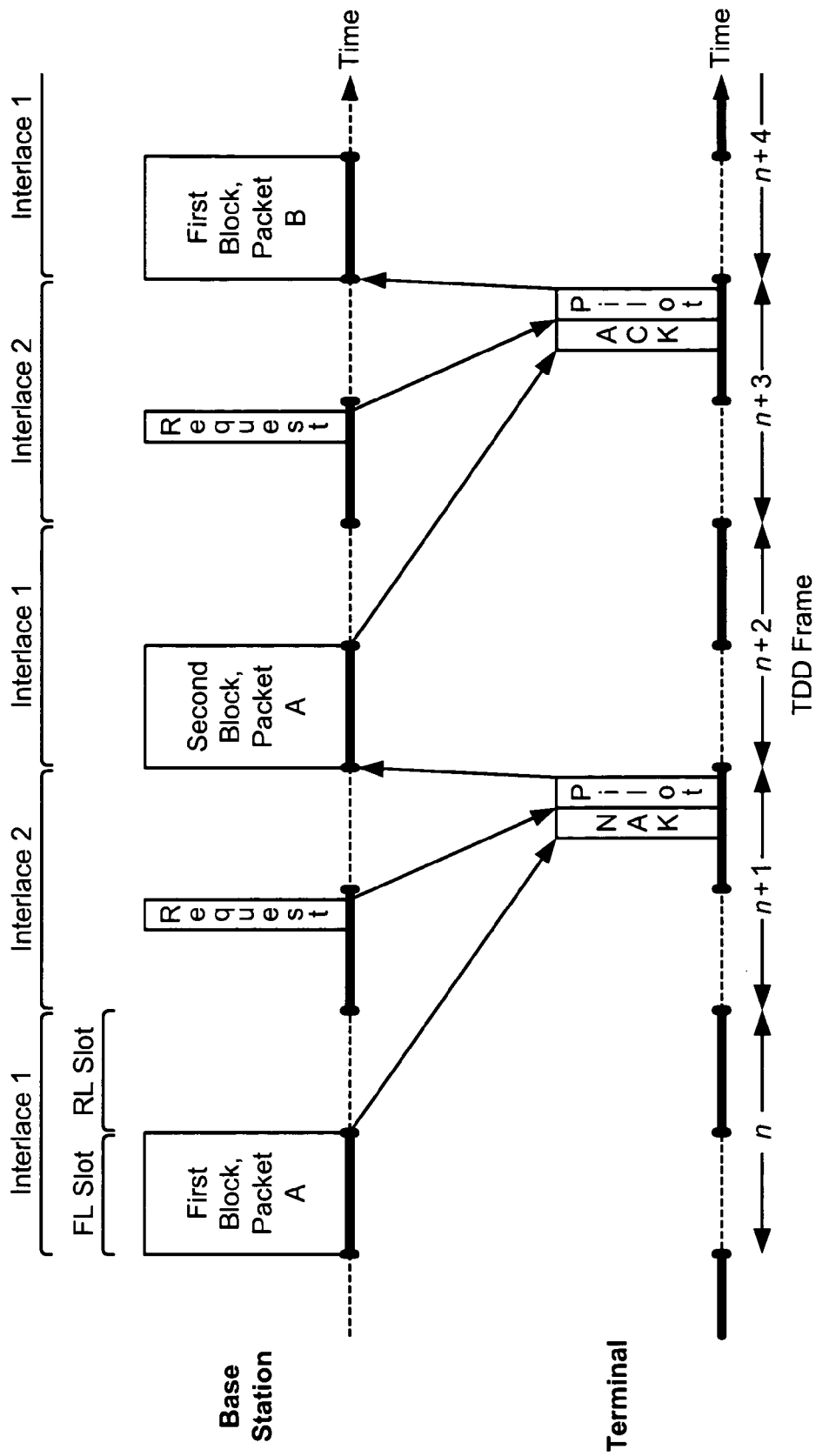
FIG. 9 shows speculative on-demand pilot transmission.

FIG. 9 shows an embodiment of an H-ARQ transmission with speculative on-demand pilot transmission in a TDD system with two interlaces. For the example shown in FIG. 9, the base station transmits the first coded block for packet A to terminal u on interlace 1 in TDD frame n. Terminal u receives the first coded block, decodes packet A in error, and sends a NAK in TDD frame n+1.

The base station has not received the NAK from terminal u during the FL slot in TDD frame n+1 and selects (or speculates) one or more terminals that might receive a block transmission on interlace 1 in TDD frame n+2. For example, the base station may request on-demand pilots from terminal u (which is currently receiving the packet transmission on interlace 1) and one or more other terminals that might receive a block transmission in TDD frame n+2. The number of terminals to select and which terminals to select may be dependent on various factors such as the likelihood of the current packet transmission for terminal u being terminated, the amount of reverse link resources available for on-demand pilot transmission, and so on. The base station sends the pilot requests to all selected terminals in TDD frame n+1. Each selected terminal transmits an on-demand pilot on the reverse link in TDD frame n+1.

The base station receives the NAK from terminal u in TDD frame n+1. The base station also receives and processes the on-demand pilot from terminal u in TDD frame n+1 (assuming that terminal u was selected for on-demand pilot transmission), derives an RL channel estimate for terminal u, and transmits the second coded block for packet A to terminal u on interlace 1 in TDD frame n+2. Terminal u receives the second coded block, decodes packet A correctly, and sends an ACK in TDD frame n+3.

The base station has not received the ACK from terminal u during the FL slot in TDD frame n+3 and selects one or more terminals that might receive a block transmission on interlace 1 in TDD frame n+4. The base station sends pilot requests to all selected terminals in TDD frame n+3. The base station receives the ACK from terminal u in TDD frame n+3 and terminates the packet transmission for terminal u. The base station then schedules terminal u or another terminal for a new packet transmission on interlace 1 starting in TDD frame n+4. If the scheduled terminal was selected for on-demand pilot transmission in TDD frame n+3, then the base station can derive an FL channel estimate for this terminal based on the on-demand pilot received from the terminal in TDD frame n+3 and can then use the FL channel estimate for the FL data transmission in TDD frame n+4. If the scheduled terminal is not one of the terminals selected for on-demand pilot transmission in TDD frame n+3, then the base station does not use advanced transmission techniques for the first block transmission to the terminal. The base station can use the advanced transmission techniques for subsequent block transmissions to this terminal.

As shown in FIG. 9, with speculative pilot requests, no additional delay (and thus no additional retransmission latency) is incurred to support on-demand pilot transmission. The base station may select more than one terminal for on-demand pilot transmission on the reverse link at the cost of additional resources.

In another embodiment of on-demand pilot transmission, a terminal that is scheduled for data transmission on the forward link transmits an on-demand pilot on the reverse link for the entire duration in which the terminal is scheduled. For this embodiment, the base station does not have an FL channel estimate for the terminal at the start of the scheduled interval and transmits data without knowledge of the FL channel response in the first transmission to the terminal. The scheduled terminal is implicitly requested to transmit an on-demand pilot on the reverse link. The base station can derive an FL channel estimate for the terminal based on the on-demand pilot and can employ advanced transmission techniques for each subsequent transmission to the terminal. This embodiment has several advantages including (1) efficient utilization of the reverse link resources, (2) no additional delay to support on-demand pilot transmission and hence small retransmission latency, and (3) minimal or no signaling needed to send pilot requests.

Figure 10:
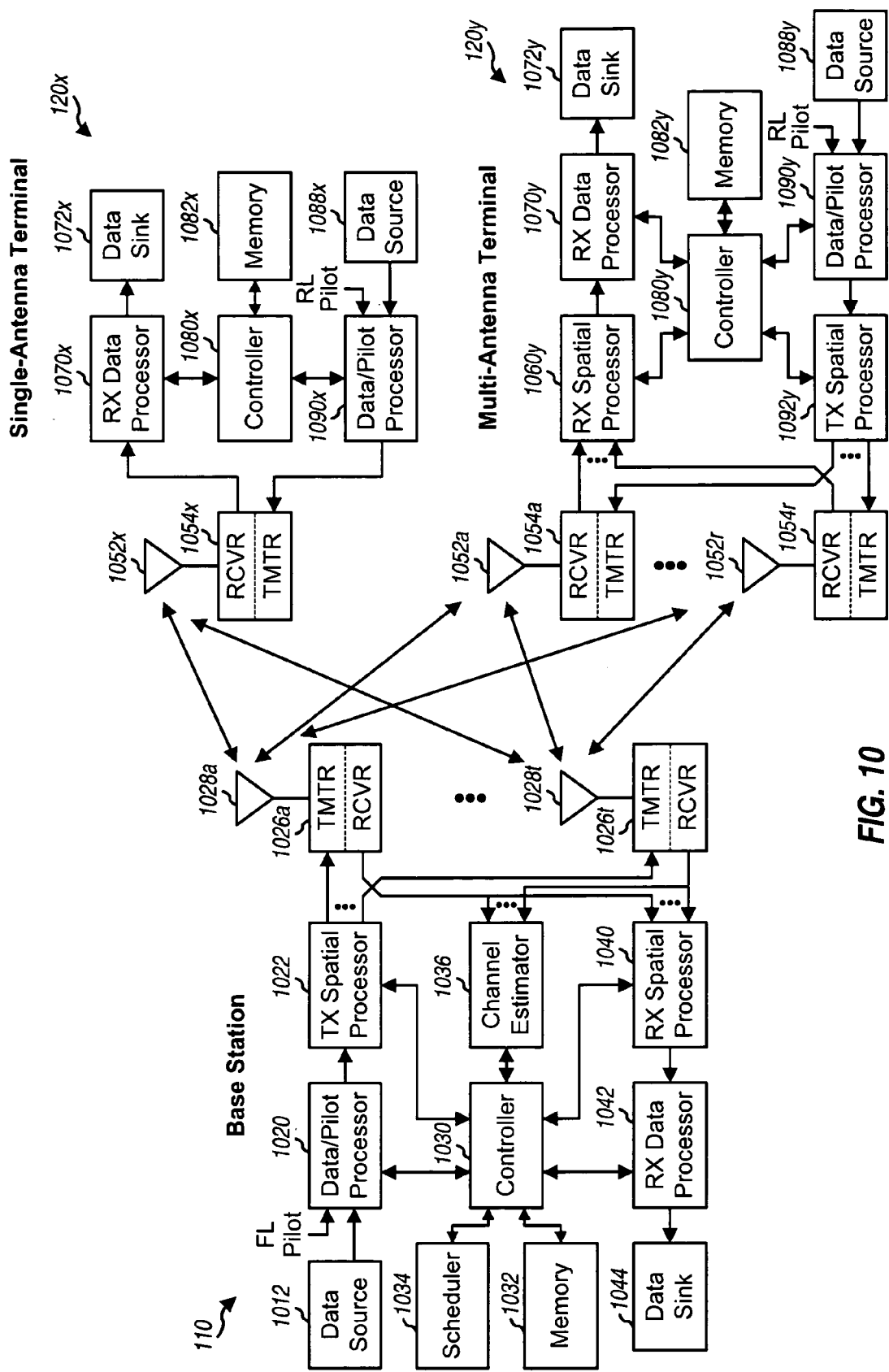
FIG. 10 shows a block diagram of a base station and two terminals.

FIG. 10 shows an embodiment of base station 110 and two terminals 120x and 120y in TDD system 100. Base station 110 is equipped with multiple (T) antennas 1028a through 1028t, terminal 120x is equipped with a single antenna 1052x, and terminal 120y is equipped with multiple (R) antennas 1052a through 1052r.

On the forward link, at base station 110, a data/pilot processor 1020 receives traffic data from a data source 1012 for all scheduled terminals and signaling (e.g., pilot requests) from a controller 1030. Data/pilot processor 1020 encodes, interleaves, and symbol maps the traffic data and signaling to generate data symbols and further generates pilot symbols for the forward link. As used herein, a data symbol is a modulation symbol for traffic/packet data, a pilot symbol is a symbol for pilot (which is data that is known a priori by both the transmitter and receiver), a modulation symbol is a complex value for a point in a signal constellation for a modulation scheme (e.g., M-PSK or M-QAM), and a symbol is any complex value. A TX spatial processor 1022 performs spatial processing on the data symbols for advance transmission techniques, multiplexes in the pilot symbols, and provides transmit symbols to transmitter units (TMTR) 1026a through 1026t. Each transmitter unit 1026 processes its transmit symbols (e.g., for OFDM) and generates an FL modulated signal. The FL modulated signals from transmitter units 1026a through 1026t are transmitted from antennas 1028a through 1028t, respectively.

At each terminal 120, one or multiple antennas 1052 receive the transmitted FL modulated signals, and each antenna provides a received signal to a respective receiver unit (RCVR) 1054. Each receiver unit 1054 performs processing complementary to the processing performed by transmitter units 1026 and provides received symbols. For multi-antenna terminal 120y, a receive (RX) spatial processor 1060y performs spatial processing on the received symbols to obtain detected symbols, which are estimates of the transmitted data symbols. For each terminal, an RX data processor 1070 symbol demaps, deinterleaves, and decodes the received or detected symbols and provides decoded data to a data sink 1072. RX data processor 1070 also provides detected signaling (e.g., pilot request) to a controller 1080.

On the reverse link, traffic data from a data source 1088 and signaling (e.g., ACKs/NAKs) to be sent by each terminal 120 are processed by a data/pilot processor 1090, further processed by a TX spatial processor 1092 if multiple antennas are present, conditioned by transmitter unit(s) 1054, and transmitted from antenna(s) 1052. At base station 110, the transmitted RL modulated signals from terminals 120 are received by antennas 1028, conditioned by receiver units 1026, and processed by an RX spatial processor 1040 and an RX data processor 1042 in a manner complementary to the processing performed at the terminals. RX data processor 1042 provides decoded data to a data sink 1044 and detected signaling to controller 1030.

Controllers 1030, 1080x and 1080y control the operation of various processing units at base station 110 and terminals 120x and 120y, respectively. Memory units 1032, 1082x and 1082y store data and program codes used by controllers 1030, 1080x and 1080y, respectively. A scheduler 1034 schedules terminals for data transmission on the forward and reverse links.

For on-demand pilot transmission, controller 1030 may select terminals for pilot transmission on the reverse link. At each selected terminal, data/pilot processor 1090 generates the on-demand pilot, which may be processed by a TX spatial processor 1092 if present, conditioned by transmitter unit(s) 1054 and transmitted from antenna(s) 1052. At base station 110, the on-demand pilot transmissions from all selected terminals are received by antennas 1028, processed by receiver units 1026, and provided to a channel estimator 1036. Channel estimator 1036 estimates the RL channel response for each selected terminal, determines the FL channel estimate for each selected terminal based on its RL channel estimate, and provides the FL channel estimates for all selected terminals to controller 1030. Scheduler 1034 may use the FL channel estimates for advanced scheduling techniques (e.g., frequency-sensitive scheduling) to schedule terminals for FL data transmission. Controller 1030 and/or TX spatial processor 1022 may use the FL channel estimates for advanced transmission techniques (e.g., beamforming or eigensteering) to transmit data to the scheduled terminals.

In FIG. 10, a MISO channel is formed between base station 110 and single-antenna terminal 120x. This MISO may be characterized by a 1×T channel response row vector $\underline{h}_x(k)$ for each subband k, which may be expressed as:

$$\underline{h}_x(k)=[h_{x,1}(k) h_{x,2}(k) \ldots h_{x,T}(k)], \text{ for } k \in \{1, \ldots, K\}, \quad \text{Eq (1)}$$

where $h_{x,j}(k)$, for $j=1, \ldots, T$, is the complex channel gain between antenna j at base station 110 and the single antenna at terminal 120x for subband k. The channel response is also a function of time, which is not shown for simplicity.

Base station 110 may perform spatial processing for beamforming for terminal 120x, as follows:

$$\underline{x}_x(k)=\underline{h}_x^H(k) \cdot s_x(k), \quad \text{Eq (2)}$$

where $s_x(k)$ is a data symbol to be sent on subband k to terminal 120x, $\underline{x}_x(k)$ is a vector with T transmit symbols to be sent from the T antennas at the base station, and "$H$" denotes a conjugate transpose. The beamforming steers the FL data transmission toward terminal 120x and improves performance. Equation (2) indicates that the FL channel estimate is needed for beamforming to terminal 120x.

Terminal 120x obtains received symbols for the FL data transmission, which may be expressed as:

$$\begin{aligned} r_x(k) &= \underline{h}_x(k) \cdot \underline{x}_x(k) + w_x(k) \\ &= \underline{h}_x(k) \cdot \underline{h}_x^H(k) \cdot s_x(k) + w_x(k), \\ &= \|\underline{h}_x(k)\|^2 \cdot s_x(k) + w_x(k), \end{aligned} \quad \text{Eq (3)}$$

where $\|\underline{h}_x(k)\|^2$ is an overall gain observed by data symbol $s_x(k)$, $r_x(k)$ is the received symbol for subband k at terminal 120x, and $w_x(k)$ is the noise at terminal 120x. Terminal 120x does not need to be aware of the beamforming performed by base station 110 and can process the received symbols as if the FL data transmission was sent from one antenna.

In FIG. 10, a MIMO channel is formed between base station 110 and multi-antenna terminal 120y. This MIMO may be characterized by an R×T channel response matrix $\underline{H}_y(k)$ for each subband k, which may be expressed as:

$$H_y(k) = \begin{bmatrix} h_{y,1,1}(k) & h_{y,1,2}(k) & \ldots & h_{y,1,T}(k) \\ h_{y,2,1}(k) & h_{y,2,2}(k) & \ldots & h_{y,2,T}(k) \\ \vdots & \vdots & \ddots & \vdots \\ h_{y,R,1}(k) & h_{y,R,2}(k) & \ldots & h_{y,R,T}(k) \end{bmatrix}, \quad \text{Eq (4)}$$

for $k \in \{1, \ldots, K\}$, where $h_{y,i,j}(k)$, for $i=1, \ldots, R$ and $j=1, \ldots, T$, is the complex channel gain between antenna j at base station 110 and antenna i at terminal 120y for subband k. The channel response matrix $\underline{H}_y(k)$ may be diagonalized via singular value decomposition (SVD), as follows:

$$\underline{H}_y(k)=\underline{U}_y(k) \cdot \underline{\Sigma}_y(k) \cdot \underline{V}_y^H(k), \quad \text{Eq (5)}$$

where $\underline{U}_y(k)$ is a unitary matrix of left eigenvectors, $\underline{V}_y(k)$ is a unitary matrix of right eigenvectors, and $\underline{\Sigma}_y(k)$ is a diagonal matrix of singular values for subband k. The diagonal elements of $\underline{\Sigma}_y(k)$ are singular values that represent the channel gains for S eigenmodes of $\underline{H}_y(k)$, where $S \leq \min\{T, R\}$. The eigenmodes may be viewed as orthogonal spatial channels. Base station 110 may use the right eigenvectors (or columns) in $\underline{V}_y(k)$ to transmit data on the eigenmodes of $\underline{H}_y(k)$.

Base station 110 may transmit data on the best eigenmode of $\underline{H}_y(k)$ by performing spatial processing with the eigenvector for this best eigenmode, e.g., similar to the beamforming shown in equation (2). Base station 110 may also transmit data on multiple eigenmodes of $\underline{H}_y(k)$ by performing spatial processing for eigensteering, as follows:

$$\underline{x}_y(k)=\underline{V}_y(k) \cdot \underline{s}_y(k), \quad \text{Eq (6)}$$

where $\underline{s}_y(k)$ is a vector with up to S data symbols to be sent simultaneously on subband k to terminal 120y and $\underline{x}_y(k)$ is a vector with T transmit symbols to be sent from T antennas at base station 110 to terminal 120y. Equations (5) and (6) indicate that the FL channel estimate is needed for eigensteering to terminal 120y.

Terminal 120y obtains received symbols for the FL data transmission, which may be expressed as:

$$\underline{r}_y(k)=\underline{H}_y(k) \cdot \underline{x}_y(k)+\underline{w}_y(k), \quad \text{Eq (7)}$$

where $\underline{r}_y(k)$ is a vector with R received symbols for subband k and $\underline{w}_y(k)$ is the noise vector at terminal 120y.

Terminal 120y performs receiver spatial processing (or spatial matched filtering) to recover the transmitted data symbols, as follows:

$$\hat{\underline{s}}_y(k)=\underline{M}_y(k) \cdot \underline{r}_y(k)=\underline{s}_y(k)+\tilde{\underline{w}}_y(k), \quad \text{Eq (8)}$$

where $\underline{M}_y(k)$ is a spatial filter matrix for subband k and $\tilde{\underline{w}}_y(k)$ is the post-detection noise. Terminal 120y may derive the spatial filter matrix $\underline{M}_y(k)$ using any one of the following:

$$\underline{M}_{y,1}(k)=\underline{\Sigma}_y^{-1}(k) \cdot \underline{U}_y^H(k), \quad \text{Eq (9)}$$

$$\underline{M}_{y,2}(k)=[\underline{H}_{y,\text{eff}}^H(k) \cdot \underline{H}_{y,\text{eff}}(k)]^{-1} \cdot \underline{H}_{y,\text{eff}}^H(k), \quad \text{Eq (10)}$$

$$\underline{M}_{y,3}(k)=\underline{D}_y(k) \cdot [\underline{H}_{y,\text{eff}}^H(k) \cdot \underline{H}_{y,\text{eff}}(k)+\sigma_n^2 \cdot \underline{I}]^{-1} \cdot \underline{H}_{y,\text{eff}}^H(k), \quad \text{Eq (11)}$$

where $\underline{H}_{y,\text{eff}}(k)=\underline{H}_y(k) \cdot \underline{V}_y(k)$,
$\underline{D}_y(k)=[\text{diag}[\underline{M}'_{y,3}(k) \cdot \underline{H}_{y,\text{eff}}(k)]]^{-1}$, and
$\underline{M}'_{y,3}(k)=[\underline{H}_{y,\text{eff}}^H(k) \cdot \underline{H}_{y,\text{eff}}(k)+\sigma_n^2 \cdot \underline{I}]^{-1} \cdot \underline{H}_{y,\text{eff}}^H(k)$.

Equation (9) is for a matched filtering technique, equation (10) is for a zero-forcing technique, and equation (11) is for a minimum mean square error (MMSE) technique.

Single-antenna terminal 120x transmits an on-demand pilot on the reverse link when requested by base station 110. Base station 110 can derive estimates of $h_{x,j}(k)$ for $j=1, \ldots, T$ based on the on-demand pilot from terminal 120x.

Multi-antenna terminal 120y also transmits an on-demand pilot on the reverse link when requested by base station 110. Terminal 120y may transmit the on-demand pilot in various manners to allow base station 110 to derive estimates of $h_{y,i,j}(k)$, for $i=1, \ldots, R$ and $j=1, \ldots, T$. In an embodiment, terminal 120y covers the pilot from each antenna with a different orthogonal code using CDM. R different orthogonal codes are used for the R antennas at terminal 120y. In another embodiment, terminal 120y transmits the pilot for each antenna on a different subset of subbands using FDM. R different subband subsets are used for the R antennas. In yet another embodiment, terminal 120y transmits the pilot for each antenna on a different time interval using TDM. Terminal 120y may also transmit R pilots from the R antennas using a combination of CDM, FDM, and TDM. In any case, base station 110 can recover the pilot from each terminal antenna based on the orthogonal code, the subband subset, and/or the time interval used for that antenna.

Terminal 120y may have only one transmit chain and may be able to transmit from one antenna but receive from multiple antennas. In this case, terminal 120y may transmit an on-demand pilot from only one antenna. Base station 10 may derive one row of the channel response matrix $\underline{H}_y(k)$ corresponding to the antenna used by terminal 120y to transmit the on-demand pilot. Base station 110 may then perform pseudo eigen-beamforming to improve performance. For perform pseudo eigen-beamforming, base station 110 fills the remaining rows of $\underline{H}_y(k)$ with (1) random values, (2) random values selected such that the columns of $\underline{H}_y(k)$ are orthogonal to one another, (3) rows of a Fourier matrix, or (4) elements of some other matrix. Base station 110 may use $\underline{H}_y(k)$ for beamforming as shown in equation (2) or eigensteering as shown in equation (6). Base station 110 may also perform QR factorization on $\underline{H}_y(k)$ to obtain a unitary matrix $\underline{Q}_y(k)$ and an upper triangle matrix $\underline{R}_y(k)$. Base station 110 may then transmit data using $\underline{Q}_y(k)$.

The above description assumes that the forward and reverse links are reciprocal. The frequency responses of the transmit and receive chains at the base station may be different from the frequency responses of the transmit and receive chains at the terminals. In particular, the frequency responses of the transmit and receive chains used for FL transmission may be different from the frequency responses of the transmit and receive chains used for RL transmission. In this case, calibration may be performed to account for the differences in the frequency responses so that the overall channel response observed by the FL transmission is reciprocal of the overall channel response observed by the RL transmission.

As noted above, the on-demand pilot transmission techniques may be used for various communication systems. These techniques may be advantageously used for an OFDMA system, a frequency hopping OFDMA (FH-OFDMA) system, and other systems with narrowband transmissions on the reverse link. In such a system, a regular narrowband pilot may be sent along with the RL data transmission, e.g., using TDM. The base station may use this regular narrowband pilot for coherent demodulation of the RL data transmission and for time/frequency tracking of the reverse link. Requiring many or all terminals to continuously or frequently transmit regular wideband pilots on the reverse link to support FL data transmission would result in very inefficient use of the RL resources. Instead, wideband and/or narrowband on-demand pilots may be sent if and when needed on the reverse link to facilitate FL channel estimation and data transmission.

The on-demand pilot transmission techniques described herein may be implemented by various means. For example, these techniques may be implemented in hardware, software, or a combination thereof. The processing units used to perform or support on-demand pilot transmission at the base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform or support on-demand pilot transmission at the terminal may also be implemented within one or more ASICs, DSPs, and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a controller operative to select at least one terminal for an on-demand pilot transmission on a reverse link, the at least one terminal being a candidate for data transmission;
   a channel estimator operative to process the on-demand pilot transmission from each of the at least one terminal and to derive a channel estimate for said each terminal based on the on-demand pilot transmission from the terminal; and
   a processor operative to process the data for transmission to each of one or more terminals, in the at least one terminal, scheduled for data transmission using the channel estimate for the terminal, wherein the processor is operative to perform pseudo eigen-beamforming for the terminal scheduled for the data transmission using the channel estimate for the terminal.

2. The apparatus of claim 1, wherein the controller is operative to assign each of the at least one terminal with a time-frequency allocation for on-demand pilot transmission on the reverse link.

3. The apparatus of claim 1, wherein each of the at least one terminal is assigned a frequency segment for transmission of signaling and the on-demand pilot on the reverse link, and wherein the channel estimator is operative to process on-demand pilot transmission on at least one additional frequency segment from each of the at least one terminal.

4. The apparatus of claim 1, wherein the channel estimator is operative to process a wideband on-demand pilot transmission from each of the at least one terminal and to derive a wideband channel estimate for each terminal based on the wideband on-demand pilot transmission from the terminal.

5. The apparatus of claim 1, wherein the channel estimator is operative to process a narrowband on-demand pilot transmission from each of the at least one terminal and to derive a narrowband channel estimate for each terminal based on the narrowband on-demand pilot transmission from the terminal.

6. The apparatus of claim 1, wherein the controller is operative to request each of the at least one terminal to transmit an on-demand wideband pilot or an on-demand narrowband pilot.

7. The apparatus of claim 1, wherein the channel estimator is operative to receive the on-demand pilot transmission from each terminal scheduled for data transmission prior to each transmission of data to the terminal.

8. The apparatus of claim 1, wherein the controller is operative to select each terminal scheduled for data transmission for the on-demand pilot transmission on the reverse link.

9. The apparatus of claim 1, wherein the controller is operative to receive feedback for prior transmissions of data and to select the at least one terminal for the on-demand pilot transmission on the reverse link based on the received feedback.

10. The apparatus of claim 1, further comprising:
    a scheduler operative to schedule the one or more terminals for the data transmission based on the channel estimate derived for the at least one terminal selected for the on-demand pilot transmission on the reverse link.

11. The apparatus of claim 10, wherein the channel estimator is operative to derive a wideband channel estimate for each of the at least one terminal, and wherein the scheduler is operative to schedule the one or more terminals for the data transmission on frequency subbands determined by the wideband channel estimate for the at least one terminal.

12. The apparatus of claim 1, further comprising:
a scheduler operative to schedule the data transmission such that the on-demand pilot transmission is received from each terminal scheduled for data transmission between consecutive transmissions of the data to the terminal.

13. The apparatus of claim 1, wherein the processor is operative to perform beamforming for a terminal scheduled for the data transmission using the channel estimate for the terminal.

14. The apparatus of claim 1, wherein the processor is operative to perform eigensteering for the terminal scheduled for the data transmission using the channel estimate for the terminal.

15. A method of transmitting pilot in a communication system, comprising:
selecting, with a processor, at least one terminal for an on-demand pilot transmission on a reverse link, the at least one terminal being candidate for data transmission;
processing, with the processor, the on-demand pilot transmission from each of the at least one terminal;
deriving, with the processor, a channel estimate for each of the at least one terminal based on the on-demand pilot transmission from the terminal;
scheduling, with the processor, each terminal, in the at least one terminal, for data transmission using the channel estimate for the terminal; and
performing, with the processor, pseudo eigen-beamforming for the each terminal scheduled for data transmission using the channel estimate for the terminal.

16. The method of claim 15, wherein the selecting the at least one terminal for the on-demand pilot transmission on the reverse link comprises
receiving feedback for prior transmissions of data, and
selecting the at least one terminal for the on-demand pilot transmission on the reverse link based on the received feedback.

17. The method of claim 15, further comprising:
performing spatial processing for the data transmission to each scheduled terminal based on the channel estimate for the scheduled terminal.

18. An apparatus in a communication system, comprising:
means for selecting at least one terminal for an on-demand pilot transmission on a reverse link, the at least one terminal being candidate for data transmission;
means for the processing on-demand pilot transmission from each of the at least one terminal;
means for deriving a channel estimate for each of the at least one terminal based on the on-demand pilot transmission from the terminal;
means for transmitting data to each terminal, in the at least one terminal, scheduled for the data transmission using the channel estimate for the terminal; and
means for performing pseudo eigen-beamforming for the each terminal scheduled for the data transmission using the channel estimate for the terminal.

19. The apparatus of claim 18, wherein the means for selecting the at least one terminal for the on-demand pilot transmission on the reverse link comprises
means for receiving feedback for prior transmissions of data, and
means for selecting at least one terminal for the on-demand pilot transmission on the reverse link based on the received feedback.

20. The apparatus of claim 18, further comprising:
means for scheduling terminals, in the at least one terminal, for data transmission based on the channel estimate derived for the at least one terminal.

21. The apparatus of claim 18, further comprising:
means for performing spatial processing for the data transmission said each scheduled terminal based on the channel estimate for the scheduled terminal.

22. A terminal comprising:
a controller operative to receive a request for an on-demand pilot transmission on a reverse link and to determine a time-frequency allocation for the on-demand pilot transmission; and
a processor operative to generate the on-demand pilot for transmission on the reverse link on the time-frequency allocation, wherein the on-demand pilot transmission on the reverse link is used for scheduling the terminal for data transmission, for spatial processing of data transmission to the terminal, or for both scheduling and spatial processing, wherein the processor is operative to perform pseudo eigen-beamforming for the terminal scheduled for the data transmission using a channel estimate for the terminal.

23. The terminal of claim 22, wherein the processor is operative to process signaling for transmission on a frequency segment assigned to the terminal, wherein the controller is operative to receive the request for the on-demand pilot transmission on at least one additional frequency segment not assigned to the terminal, and wherein the processor is further operative to generate the on-demand pilot for transmission on the at least one additional frequency segment.

24. The terminal of claim 22, wherein the processor is operative to generate a wideband on-demand pilot for transmission on the reverse link, and wherein the data transmission on the reverse link is narrowband.

25. The terminal of claim 22, wherein the processor is operative to generate a narrowband on-demand pilot for transmission on the reverse link and on frequency subbands usable for the data transmission to the terminal.

26. The terminal of claim 22, wherein the processor is operative to generate the on-demand pilot using time division multiplexing (TDM), frequency division multiplexing (FDM), code division multiplexing (CDM), or a combination thereof.

27. The terminal of claim 22, wherein the processor is operative to generate the on-demand pilot for transmission from multiple antennas using time division multiplexing (TDM), frequency division multiplexing (FDM), code division multiplexing (CDM), or a combination thereof.

28. The terminal of claim 22, wherein the controller is operative to determine whether a packet transmitted to the terminal is decoded correctly and to implicitly receive the request for the on-demand pilot transmission on the reverse link if the packet is not decoded correctly.

29. A method of transmitting pilot in a communication system, comprising:
receiving at a terminal a request for an on-demand pilot transmission on a reverse link;
determining, with a processor, a time-frequency allocation for the on-demand pilot transmission;
transmitting the on-demand pilot on the reverse link on the time-frequency allocation, wherein the on-demand pilot transmission on the reverse link is used for scheduling the terminal for data transmission on a forward link, for spatial processing of data transmission to the terminal, or for both scheduling and spatial processing; and performing, with the processor in the terminal, pseudo eigen-beamforming for the terminal scheduled for the data transmission using a channel estimate for the terminal.

30. The method of claim 29, further comprising:
transmitting signaling on a frequency segment assigned to the terminal, and wherein the request is for on-demand pilot transmission on at least one additional frequency segment not assigned to the terminal.

31. The method of claim 29, wherein the transmitting the on-demand pilot on the reverse link comprises
transmitting a wideband on-demand pilot on the reverse link.

32. The method of claim 29, wherein the transmitting the on-demand pilot on the reverse link comprises
transmitting a narrowband on-demand pilot on the reverse link and on frequency subbands used for the data transmission to the terminal on the forward link.

33. A processor for transmitting pilot in a communication system, the processor comprising:
means for selecting at least one terminal for an on-demand pilot transmission on a reverse link, the at least one terminal being candidate for data transmission;
means for processing the on-demand pilot transmission from each of the at least one terminal;
means for deriving a channel estimate for each of the at least one terminal based on the on-demand pilot transmission from the terminal;
means for transmitting data to each terminal scheduled for the data transmission using the channel estimate for the terminal; and
means for performing pseudo eigen-beamforming for the each terminal scheduled for the data transmission using the channel estimate for the terminal.

34. The processor as recited in claim 33, the processor further comprising:
means for scheduling terminals, in the at least one terminal, for data transmission based on the channel estimate derived for the at least one terminal.

35. The processor as recited in claim 33, the processor further comprising:
means for performing spatial processing for the data transmission to each scheduled terminal based on the channel estimate for the scheduled terminal.

* * * * *

UNITED STATES PATENT AND TRADEMARK OFFICE
CERTIFICATE OF CORRECTION

| | | |
|---|---|---|
| PATENT NO. | : 7,706,324 B2 | |
| APPLICATION NO. | : 11/129636 | |
| DATED | : April 27, 2010 | |
| INVENTOR(S) | : Sutivong et al. | |

It is certified that error appears in the above-identified patent and that said Letters Patent is hereby corrected as shown below:

Column 16, line 16, claim 1: "data transmission" to read as --the data transmission--

Column 17, line 8, claim 13: "a terminal" to read as --the terminal--

Column 19, line 23, claim 33: "candidate" to read as --a candidate--

Signed and Sealed this
Nineteenth Day of July, 2011

David J. Kappos
*Director of the United States Patent and Trademark Office*